United States Patent
Deguchi et al.

(10) Patent No.: US 12,491,764 B2
(45) Date of Patent: Dec. 9, 2025

(54) TRAVEL CONTROL DEVICE

(71) Applicant: SUZUKI MOTOR CORPORATION, Hamamatsu (JP)

(72) Inventors: Hiromi Deguchi, Hamamatsu (JP); Shoji Yanagida, Hamamatsu (JP); Koji Kobayashi, Hamamatsu (JP); Takuya Okamura, Hamamatsu (JP); Hirotoshi Mochiyama, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 214 days.

(21) Appl. No.: 18/365,572

(22) Filed: Aug. 4, 2023

(65) Prior Publication Data

US 2024/0059144 A1    Feb. 22, 2024

(30) Foreign Application Priority Data

Aug. 22, 2022    (JP) ................ 2022-131996

(51) Int. Cl.
*B60K 31/00*      (2006.01)
*B62J 45/412*      (2020.01)
*B62J 45/415*      (2020.01)

(52) U.S. Cl.
CPC .......... *B60K 31/00* (2013.01); *B62J 45/412* (2020.02); *B60K 2031/0091* (2013.01); *B62J 45/4151* (2020.02)

(58) Field of Classification Search
CPC .......... B60K 31/00; B60K 2031/0091; B62J 45/412; B62J 45/4151; B60W 30/146;
(Continued)

(56) References Cited

U.S. PATENT DOCUMENTS 9,499,196 B2 * 11/2016 Kariatsumari ........... B62D 6/10
2009/0171546 A1 * 7/2009 Tozuka .................. B60K 31/04
                                                                          701/1
(Continued)

FOREIGN PATENT DOCUMENTS

CN        1647981 A    *   8/2005     ......... B60K 31/0008
CN     115452284 A    *   12/2022     ......... G06V 20/597
(Continued)

OTHER PUBLICATIONS

DE_102008007139_A1_I_translation (Year: 2008).*
(Continued)

*Primary Examiner* — Kyle T Johnson
(74) *Attorney, Agent, or Firm* — Stein IP, LLC

(57) ABSTRACT

A travel control device for controlling traveling of a straddle-type vehicle includes a control device, a vehicle speed detector configured to detect a traveling speed of the vehicle, and a vibration detector configured to detect a detection target vibration which is a vibration in a yaw direction or roll direction of the vehicle and has a frequency within a reference frequency range. The control device includes a deceleration device configured to perform a deceleration control to decelerate the traveling speed if the traveling speed exceeds a control start reference speed and an amplitude of the detection target vibration exceeds a control start reference amplitude and a deceleration stop device configured to stop the deceleration control if the traveling speed becomes equal to or less than a target limited speed after the deceleration control is started by the deceleration device.

9 Claims, 10 Drawing Sheets

(58) Field of Classification Search
CPC ....... B60W 2030/043; B60W 2300/36; B60W 2510/0604; B60W 2520/10; B60W 2520/14; B60W 2520/18; B60W 2540/10; B60W 2710/0605; B60W 2720/106; B60W 30/02; B60T 2230/03; B60T 2230/06; B60T 8/1706; B60T 8/175; B60T 8/1755; B60T 8/3225; B60T 7/12; B60Y 2200/12
See application file for complete search history.

(56) References Cited

U.S. PATENT DOCUMENTS

| | | | | |
|---|---|---|---|---|
| 2011/0012721 | A1* | 1/2011 | Kamen | G05D 1/0212 340/439 |
| 2013/0211686 | A1* | 8/2013 | Shono | G06F 17/00 701/70 |
| 2017/0327109 | A1* | 11/2017 | Watanabe | B60W 50/12 |
| 2018/0170472 | A1* | 6/2018 | Corno | B62J 45/414 |
| 2019/0039429 | A1* | 2/2019 | Fujii | B60G 17/0152 |
| 2020/0004261 | A1* | 1/2020 | Kim | B60W 60/00186 |
| 2023/0391324 | A1* | 12/2023 | Zarringhalam | B60W 30/12 |
| 2024/0059144 | A1* | 2/2024 | Deguchi | B60T 8/1706 |

FOREIGN PATENT DOCUMENTS

| | | | | |
|---|---|---|---|---|
| CN | 117681838 | A * | 3/2024 | B64C 25/44 |
| DE | 102008007139 | A1 * | 8/2008 | B60T 8/1755 |
| JP | 05246370 | A * | 9/1993 | |
| JP | A-H05-270472 | | 10/1993 | |
| JP | 2021054328 | A * | 4/2021 | B60T 8/1706 |
| JP | 7058481 | B2 * | 4/2022 | B60T 7/12 |

OTHER PUBLICATIONS

JP_05246370_A_I_translation (Year: 1993).*
JP_2021054328_A_I_translation (Year: 2021).*
JP_7058481_B2_I_translation (Year: 2022).*
CN-1647981-A translation (Year: 2005).*
CN-117681838-A translation (Year: 2024).*
CN-115452284-A translation (Year: 2022).*

* cited by examiner

A: CONTROL START REFERENCE TOTAL AMPLITUDE
B: CONTROL STOP REFERENCE TOTAL AMPLITUDE
C: CONTROL START REFERENCE SPEED
D: TARGET LIMITED SPEED INITIAL VALUE
E: CHANGED TARGET LIMITED SPEED
F: REFERENCE BANK ANGLE
G: TARGET LIMITED OPENING DEGREE (CONT.)

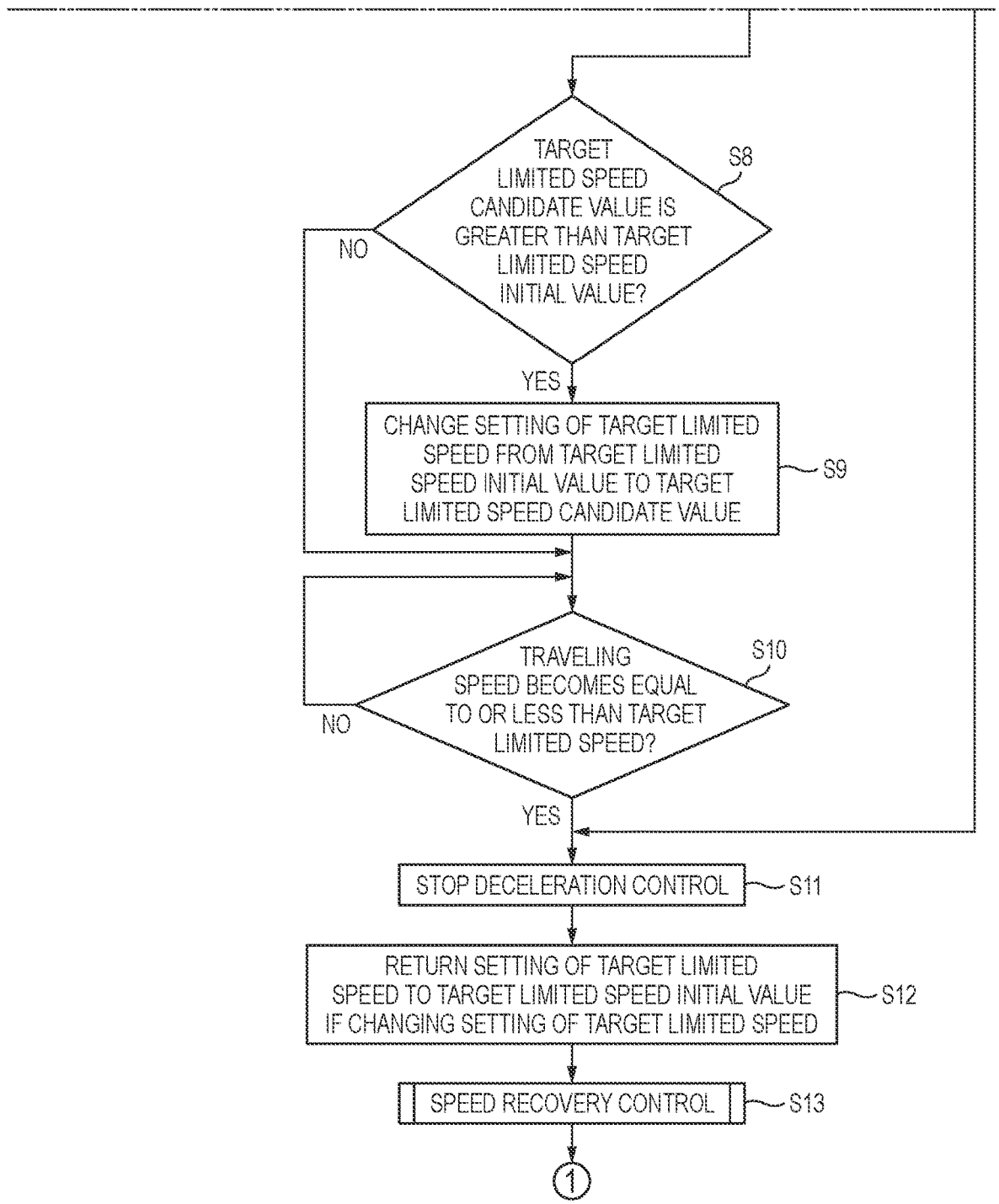

(CONT.)

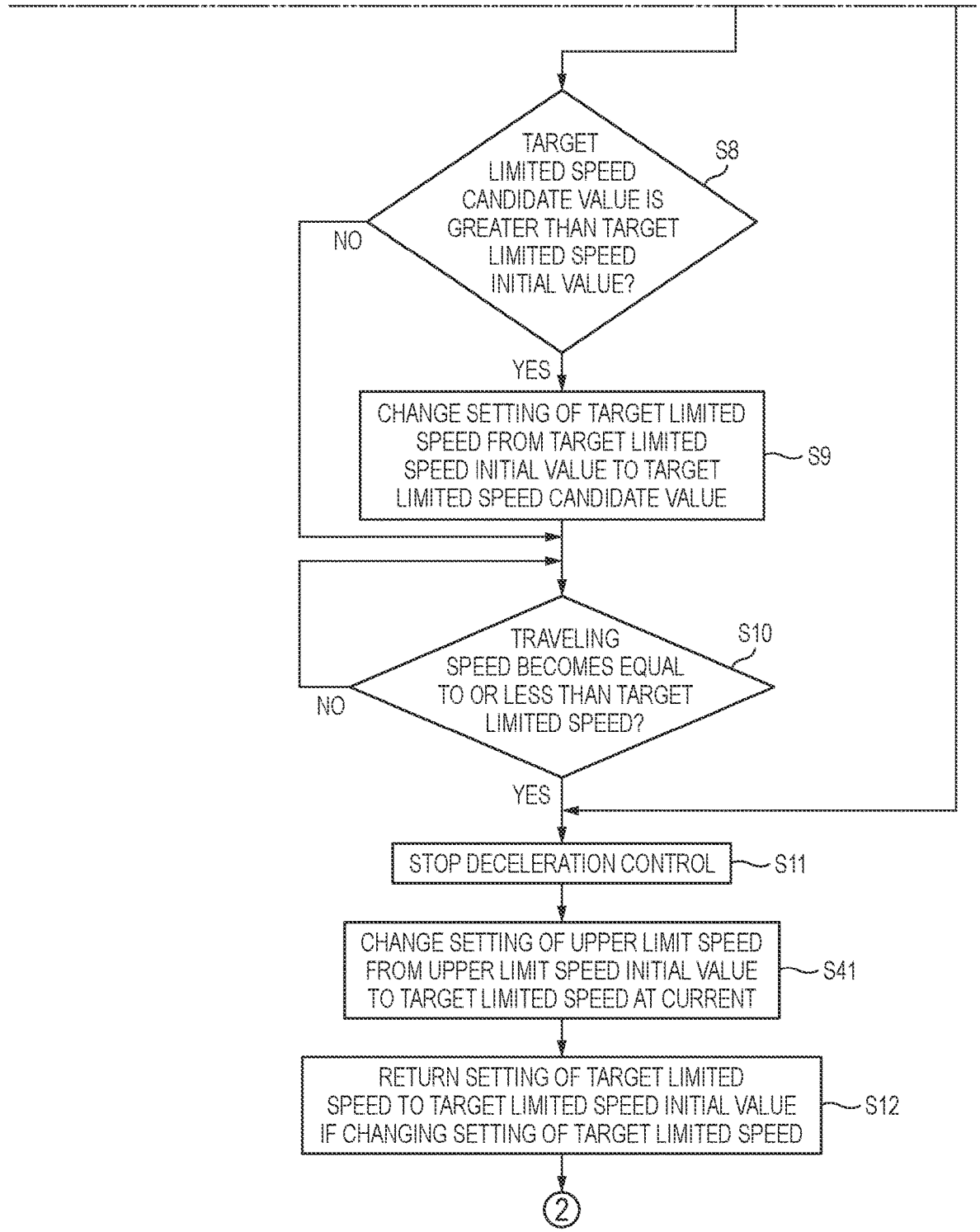

TRAVEL CONTROL DEVICE

CROSS-REFERENCE TO RELATED APPLICATIONS

This application is based on Japanese Patent Application No. 2022-131996 filed on Aug. 22, 2022, the contents of which are incorporated herein by way of reference.

TECHNICAL FIELD

The present disclosure relates to a travel control device that controls traveling of a straddle-type vehicle.

BACKGROUND

When a straddle-type vehicle such as a motorcycle is traveling straight at medium to high speed, a vehicle body and a steering may vibrate at a frequency of approximately 1 Hz to 10 Hz. This phenomenon is generally called a weave phenomenon or a wobble phenomenon. More specifically, the weave phenomenon is a phenomenon in which vibrations in a direction of coupled yaw and roll occur in a straddle-type vehicle when the straddle-type vehicle is traveling straight at medium to high speed. The wobble phenomenon is a phenomenon in which a steering shaft of a steering of a straddle-type vehicle vibrates when the straddle-type vehicle is traveling straight at medium to high speed. A frequency of the vibration in the weave phenomenon is approximately 1 Hz to 4 Hz, and a frequency of the vibration in the wobble phenomenon is approximately 5 Hz to 10 Hz. Both the weave phenomenon and the wobble phenomenon are factors that lower a straight traveling stability of the straddle-type vehicle. Hereinafter, a concept including the vibration in the weave phenomenon and the vibration in the wobble phenomenon will be referred to as "wobble".

Patent Literature 1 below describes a caster angle variable device for a two-wheeled vehicle that increases a caster angle to improve maneuverability of the vehicle when a vehicle speed and a vibration state reach or exceed a certain level. The caster angle variable device for a two-wheeled vehicle includes an actuator that displaces a front wheel fork of the two-wheeled vehicle to change the caster angle.

Patent Literature 1: JPH05-270472A

It is desirable to prevent wobble in order not to lower a straight traveling stability of a straddle-type vehicle during medium-to-high-speed traveling. However, it is not preferable to increase a size or weight of the straddle-type vehicle to prevent the wobble. For example, in order to prevent the wobble, when the caster angle variable device described in Patent Literature 1 is applied to a straddle-type vehicle, adding the actuator for displacing the front wheel fork to the straddle-type vehicle may increase a size or weight of the straddle-type vehicle.

SUMMARY

The present disclosure has been made in view of the above problem, for example, and an object of the present disclosure is to provide a travel control device for a straddle-type vehicle which can avoid an increase in a size or weight of the straddle-type vehicle, and prevent wobble and prevent lowering of a straight traveling stability during medium-to-high-speed traveling.

In order to solve the above problem, the present disclosure relates to a travel control device for controlling traveling of a straddle-type vehicle, including: a control device; a vehicle speed detector configured to detect a traveling speed of the straddle-type vehicle; and a vibration detector configured to detect a detection target vibration which is a vibration in a yaw direction or roll direction of the straddle-type vehicle and has a frequency within a reference frequency range, in which the control device includes: a deceleration device configured to perform a deceleration control to decelerate the traveling speed of the straddle-type vehicle if the traveling speed of the straddle-type vehicle detected by the vehicle speed detector exceeds a control start reference speed and an amplitude of the detection target vibration detected by the vibration detector exceeds a control start reference amplitude; and a deceleration stop device configured to stop the deceleration control if the traveling speed of the straddle-type vehicle detected by the vehicle speed detector becomes equal to or less than a target limited speed after the deceleration control is started by the deceleration device.

BRIEF DESCRIPTION OF DRAWINGS

FIG. 2A shows the signal indicating the detection target vibration, and FIG. 2B shows the signal indicating a total amplitude of the detection target vibration;

DESCRIPTION OF EMBODIMENTS

A travel control device according to an embodiment of the present disclosure is a device that controls traveling of a straddle-type vehicle, and includes a control device, a vehicle speed detector configured to detect a traveling speed of the vehicle, and a vibration detector configured to detect a detection target vibration which is a vibration in a yaw direction or roll direction of the vehicle and has a frequency within a reference frequency range. The control device includes a deceleration device and a deceleration stop device.

The deceleration device performs a deceleration control to decelerate the traveling speed of the vehicle if the traveling speed of the vehicle detected by the vehicle speed detector exceeds a control start reference speed and an amplitude of the detection target vibration detected by the vibration detector exceeds a control start reference amplitude.

The deceleration stop device stops the deceleration control if the traveling speed of the vehicle detected by the vehicle speed detector becomes equal to or less than a target limited speed after the deceleration control is started by the deceleration device.

According to the travel control device in the embodiment of the present disclosure, occurrence of wobble in the vehicle can be detected with high accuracy by determining whether the traveling speed of the vehicle exceeds the control start reference speed and whether the amplitude of the detection target vibration exceeds the control start reference amplitude. When the wobble occurs in the vehicle, the deceleration control is performed to decelerate the traveling speed of the vehicle, so that the wobble occurring in the vehicle can be prevented. Accordingly, it is possible to prevent lowering in a straight traveling stability of the vehicle when the vehicle is traveling at medium to high speed.

By stopping the deceleration control if the traveling speed of the vehicle becomes equal to or less than the target limited speed after the deceleration control is started, it is possible to prevent unnecessary continuation of the deceleration control after the wobble is prevented.

The travel control device according to the present embodiment can prevent the wobble by decelerating the traveling speed of the vehicle, and thus, it is not necessary to add a mechanical device or structure to the vehicle, such as mounting a caster angle variable device on the vehicle, in order to prevent the wobble. Therefore, an increase in a size or weight of the straddle-type vehicle is avoided and the wobble can be prevented.

First Embodiment (Travel Control Device)

Figure 1:
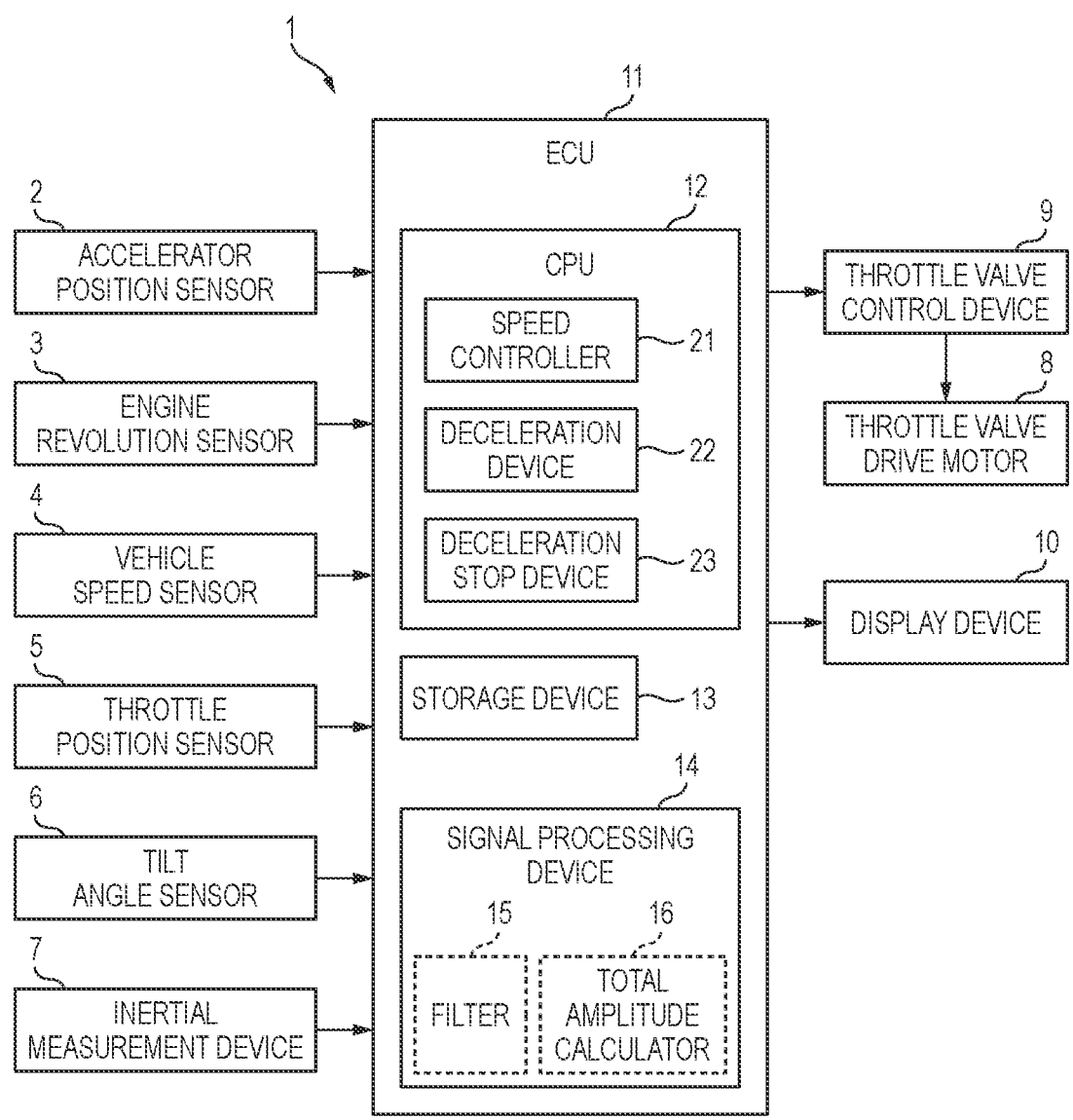
FIG. 1 is a block diagram showing a travel control device according to a first embodiment of the present disclosure.

FIG. 1 shows a travel control device 1 according to a first embodiment of the present disclosure. The travel control device 1 is a device that controls traveling of a straddle-type vehicle such as a motorcycle (hereinafter, referred to as the "vehicle"), and is provided in the vehicle. The vehicle in the present embodiment is provided with an engine (internal combustion engine) as a power source for traveling, and adopts an electronically controlled fuel injection system that electronically controls a fuel injection valve to control fuel injection, and adopts an electronically controlled throttle that electronically controls a throttle opening degree based on an accelerator opening degree and the like.

As shown in FIG. 1, the travel control device 1 includes an accelerator position sensor 2, an engine revolution sensor 3, a vehicle speed sensor 4, a throttle position sensor 5, a tilt angle sensor 6, an inertial measurement device 7, a throttle valve drive motor 8, a throttle valve control device 9, a display device 10, and an electronic control unit (ECU) 11.

The accelerator position sensor 2 is a sensor that detects an accelerator opening degree. The engine revolution sensor 3 is a sensor that detects an engine revolution speed. The vehicle speed sensor 4 is a sensor that detects a traveling speed of the vehicle. The throttle position sensor 5 is a sensor that detects a throttle opening degree. The tilt angle sensor 6 is a sensor that detects a tilt angle in a left-right direction of the vehicle with respect to a horizontal, that is, a bank angle. The inertial measurement device 7 is a device that detects a translational motion (acceleration) and a rotational motion (angular velocity) along each of three axes in a three-dimensional space. The inertial measurement device 7 includes an acceleration sensor that detects accelerations of the vehicle in a front-rear direction, the left-right direction, and an up-down direction, and a gyro or angular velocity sensor that detects angular velocities (yaw angular velocity, roll angular velocity, and pitch angular velocity) about axes in the front-rear direction, the left-right direction, and the up-down direction of the vehicle. The inertial measurement device 7 is used to detect wobble as described later, but the inertial measurement device 7 can also be used to detect the bank angle of the vehicle. The throttle valve drive motor 8 is a motor that drives a throttle valve. The throttle valve control device 9 is a device that controls the throttle valve drive motor 8. The display device 10 is a lamp or display provided on a meter of the vehicle.

The ECU 11 is a device that electrically and electronically controls the vehicle, and includes a central processing unit (CPU) 12, a storage device 13, and a signal processing device 14. The CPU 12 functions as a speed controller 21, a deceleration device 22, and a deceleration stop device 23, which will be described later, by reading and executing a program stored in the storage device 13, for example. The storage device 13 is a storage device that stores programs, data, and the like. The signal processing device 14 includes a filter 15 and a total amplitude calculator 16. The filter 15 is, for example, a low-pass filter or band-pass filter formed by a digital circuit. The total amplitude calculator 16 is a circuit or device that calculates a total amplitude of an alternating current signal.

The accelerator position sensor 2 is a specific example of an "accelerator opening degree detector", and the vehicle speed sensor 4 is a specific example of the "vehicle speed detector". The inertial measurement device 7 and the signal processing device 14 are specific examples of the "vibration detector". The throttle valve drive motor 8 and the throttle valve control device 9 are specific examples of the "throttle valve drive device". The ECU 11 is a specific example of the "control device".

(Detection of Wobble)

The travel control device 1 has a function of quickly removing or reducing the wobble when the wobble occurs in the vehicle. In order to implement this function, the inertial measurement device 7 and the signal processing device 14 detect the wobble.

As described above, the term "wobble" refers to a concept including a vibration in a weave phenomenon and a vibration in a wobble phenomenon. The vibration in the weave phenomenon is a vibration in a direction where yaw and roll are coupled, and this point is the same as the vibration in the wobble phenomenon.

The wobble can be recognized by detecting a vibration in a yaw direction or roll direction of the vehicle. In the present embodiment, the wobble is recognized by detecting the vibration of the vehicle in the yaw direction. The inertial measurement device 7 detects periodic changes in the yaw angular velocity of the vehicle, that is, the vibration of the vehicle in the yaw direction, and outputs a detection signal indicating the vibration of the vehicle in the yaw direction to the signal processing device 14.

The wobble is a vibration having a frequency of approximately 1 Hz to 10 Hz. That is, a frequency of the vibration in the weave phenomenon is approximately 1 Hz to 4 Hz, and the frequency of the vibration in the wobble phenomenon is approximately 5 Hz to 10 Hz, and thus, a frequency range of the wobble can be considered to be a range from 1 Hz, which is a lowest frequency of the vibration in the weave phenomenon, to 10 Hz, which is a highest frequency of the vibration in the wobble phenomenon.

Since the vibration of the vehicle in the yaw direction includes vibrations having various frequencies in addition to the wobble, in order to detect the wobble, the vibration having a frequency of approximately 1 Hz to 10 Hz is extracted from the vibration of the vehicle in the yaw direction. In the present embodiment, the filter 15 of the signal processing device 14 performs the extraction process. That is, the filter 15 of the signal processing device 14 extracts the vibration having a frequency within a reference frequency range from the detection signal output from the inertial measurement device 7. The reference frequency range is set to approximately 1 Hz to 10 Hz. The frequency of the wobble is approximately 1 Hz to 10 Hz, but strictly speaking, the frequency of the wobble is slightly different for each vehicle type or individual vehicle. Therefore, it is preferable to predict or measure the frequency of the wobble for each vehicle type or individual vehicle and adjust the reference frequency range accordingly for each vehicle type or individual vehicle.

The wobble is a vibration having an amplitude that lowers a straight traveling stability of the vehicle. The travel control device 1 uses, as one of determination criteria for the occurrence of the wobble, a matter that the amplitude of the vibration (hereinafter, referred to as "detection target vibration") of the vehicle in the yaw direction with a frequency within the reference frequency range increases to an extent that the straight traveling stability of the vehicle is lowered. Specifically, as will be described later, the deceleration device 22 of the travel control device 1 determines whether the number of times that a total amplitude of the detection target vibration continuously exceeds a control start reference total amplitude reaches a control start reference number of times. Therefore, the total amplitude calculator 16 of the signal processing device 14 calculates the total amplitude of the detection target vibration. That is, the signal output from the inertial measurement device 7 and passing through the filter 15 is a signal indicating the detection target vibration. This signal is input from the filter 15 to the total amplitude calculator 16. The total amplitude calculator 16 calculates a total amplitude of the signal indicating the detection target vibration as the total amplitude of the detection target vibration.

Figure 2A:
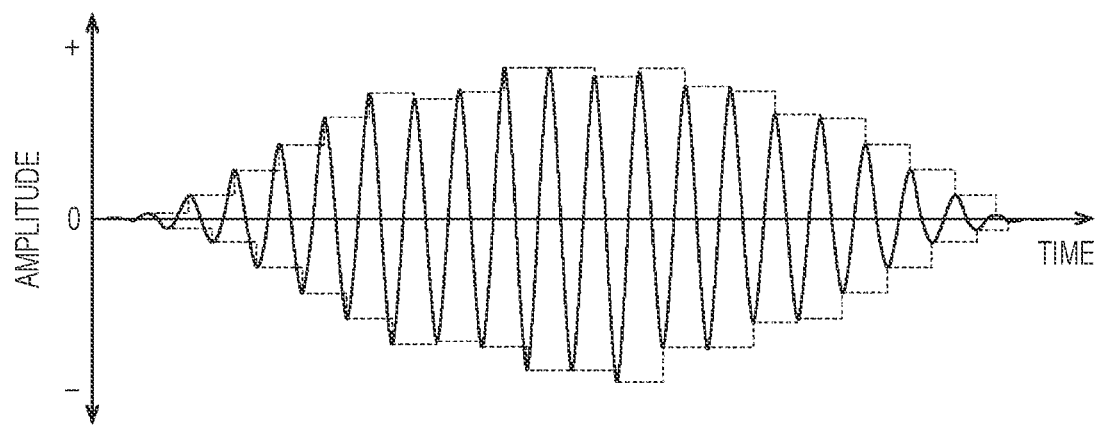
FIGS. 2A and 2B are graphs showing signals related to a detection target vibration in the travel control device according to the first embodiment of the present disclosure.
Figure 2B:
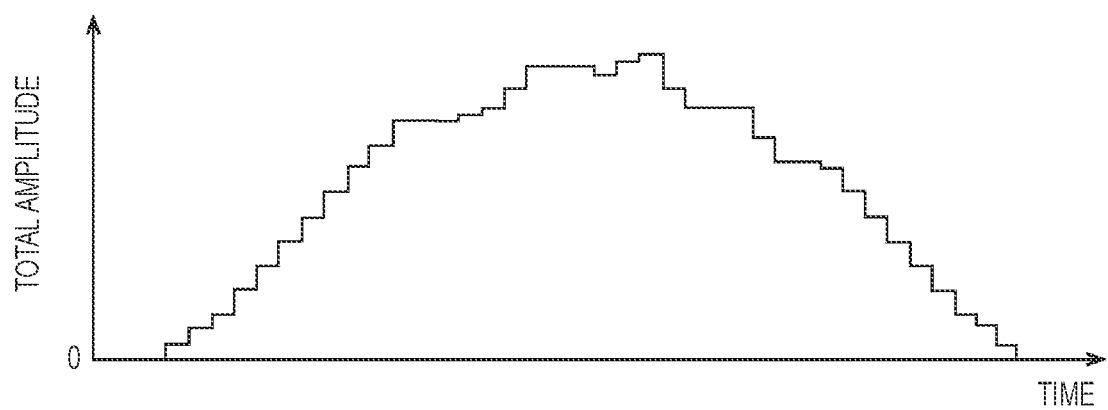

FIG. 2A shows the signal output from the inertial measurement device 7 and passing through the filter 15, that is, the signal indicating the detection target vibration. FIG. 2B shows the signal output from the total amplitude calculator 16, that is, the signal indicating the total amplitude of the detection target vibration. The total amplitude calculator 16 detects a plus side peak of the signal indicating the detection target vibration, and stores a plus side peak value. The total amplitude calculator 16 updates memory of the plus side peak value each time the total amplitude calculator 16 detects the plus side peak. The total amplitude calculator 16 detects a minus side peak of the signal indicating the detection target vibration, and stores a minus side peak value. The total amplitude calculator 16 updates memory of the minus side peak value each time the total amplitude calculator 16 detects the minus side peak. Dashed lines in FIG. 2A show a locus of the plus side peak value which is stored and updated each time the plus side peak of the signal indicating the detection target vibration is detected and a locus of the minus side peak value which is stored and updated each time the minus side peak of the signal indicating the detection target vibration is detected. The total amplitude calculator 16 calculates a difference between the plus side peak value and the minus side peak value of the signal indicating the detection target vibration, that is, the total amplitude of the signal indicating the detection target vibration in each of a timing of updating the plus side peak value of the signal indicating the detection target vibration and a timing of updating the minus side peak value of the signal indicating the detection target vibration. For example, when the signal indicating the detection target vibration in FIG. 2A is input to the total amplitude calculator 16, the signal indicating the total amplitude of the detection target vibration in FIG. 2B is output from the total amplitude calculator 16.

(Normal Speed Control)

When the wobble occurs in the vehicle, the travel control device 1 performs the deceleration control to decelerate the traveling speed of the vehicle to remove or reduce the wobble. Before describing the deceleration control, a normal control on the traveling speed of the vehicle performed by the travel control device 1 will be described. Hereinafter, the normal control on the traveling speed of the vehicle performed by the travel control device 1 will be referred to as "normal speed control". The normal speed control is performed, while the vehicle is traveling and neither deceleration control nor speed recovery control is being performed.

The normal speed control is performed by the speed controller 21 of the travel control device 1. As the normal speed control, the speed controller 21 sets a target unlimited opening degree corresponding to the accelerator opening degree detected by the accelerator position sensor 2 as a target throttle opening degree. Specifically, the target unlimited opening degree is basically determined by the accelerator opening degree and the engine revolution speed. The storage device 13 stores a throttle opening degree control map that describes a correspondence between the accelerator opening degree, the engine revolution speed, and the throttle opening degree. As the normal speed control, the speed controller 21 uses the accelerator opening degree detected by the accelerator position sensor 2, the engine revolution speed detected by the engine revolution sensor 3, and the throttle opening degree control map to determine the target unlimited opening degree, and sets the determined target unlimited opening degree as the target throttle opening degree.

The target throttle opening degree is output from the ECU 11 to the throttle valve control device 9. The throttle valve control device 9 controls the throttle valve drive motor 8 to drive the throttle valve such that the throttle opening degree coincides with the target throttle opening degree output from the ECU 11. Accordingly, while the normal speed control is being performed, the throttle opening degree changes to follow the accelerator opening degree, and as a result, the traveling speed of the vehicle changes to follow the accelerator opening degree.

(Deceleration Control)

When the wobble occurs in the vehicle, the travel control device 1 performs the deceleration control to decelerate the traveling speed of the vehicle to remove or reduce the wobble. The deceleration control is performed by the deceleration device 22 of the travel control device 1.

While the vehicle is traveling, the deceleration device 22 determines whether the traveling speed of the vehicle detected by the vehicle speed sensor 4 exceeds a control start reference speed. The deceleration device 22 determines whether the number of times that the total amplitude of the detection target vibration detected by the inertial measurement device 7 and the signal processing device 14 continuously exceeds the control start reference total amplitude reaches the control start reference number of times. The deceleration device 22 determines whether an absolute value of the bank angle of the vehicle detected by the tilt angle sensor 6 or the inertial measurement device 7 is equal to or less than a reference bank angle. As a result of these determinations, the deceleration device 22 performs the deceleration control if the traveling speed of the vehicle exceeds the control start reference speed, the number of times that the total amplitude of the detection target vibration continuously exceeds the control start reference total amplitude reaches the control start reference number of times, and the absolute value of the bank angle of the vehicle is equal to or less than the reference bank angle.

The control start reference speed is set in consideration of a lower limit of the traveling speed at which the wobble may occur in a straddle-type vehicle. The wobble differs depending on a size or specific structure of the straddle-type vehicle, but in many straddle-type vehicles, the wobble occurs when the traveling speed exceeds 100 km/h to 130 km/h. The control start reference speed is set in consideration of distinguishing the wobble from other vibrations that occur when the straddle-type vehicle travels, such as vibrations due to a low-speed shimmy phenomenon. The low-speed shimmy phenomenon varies depending on the size or type of the straddle-type vehicle, but generally occurs in a low-speed region where the traveling speed of the straddle-type vehicle is 30 km/h or more and less than 100 km/h. Considering the above points, it is preferable to set the control start reference speed to a value within a range of approximately 100 km/h to 130 km/h. The control start reference speed predicts or measures a lower limit of the traveling speed at which the wobble is likely to occur for each vehicle type or individual vehicle and may be set to a different value for each vehicle type or individual vehicle. In the present embodiment, the control start reference speed is set to 120 km/h, for example.

In order to remove or reduce the wobble early and quickly after the wobble occurs in the vehicle, the control start reference total amplitude is preferably set to a value corresponding to the total amplitude of the detection target vibration at an initial stage when the wobble occurs in the vehicle. Specifically, the control start reference total amplitude is preferably set to a value corresponding to the total amplitude of the detection target vibration when the yaw angular velocity of the vehicle is, for example, 0.26 rad/s to 0.33 rad/s. The control start reference total amplitude may also be set to a different value for each vehicle type or individual vehicle. In the present embodiment, the control start reference total amplitude is set to a value corresponding to the total amplitude of the detection target vibration when the yaw angular velocity of the vehicle is 0.29 rad/s, for example.

The control start reference number of times is set in consideration of distinguishing between the wobble that is the continuous vibration and the single impact applied to a vehicle or a vibration that instantly converges after occurrence, such as impact or vibration due to a sudden steering operation, or impact or vibration due to kickback. It is preferable to set the control start reference number of times to about 3 to 5 times. The control start reference number of times may also be set to a different value for each vehicle type or individual vehicle. In the present embodiment, the control start reference number of times is set to 4 times, for example.

The reference bank angle is set, for example, to a lower limit of the absolute value of the bank angle of the vehicle when the vehicle is turning, in order to recognize that the vehicle is turning. In the present embodiment, if the vehicle is decelerated when the vehicle is turning, since it is conceivable that a turning trajectory of the vehicle is not intended by a driver of the vehicle and it becomes difficult to steer the vehicle, the deceleration control is not performed when the vehicle is turning.

As the deceleration control, the deceleration device 22 performs control to gradually decrease an opening degree value set as the target throttle opening degree from the throttle opening degree when the vehicle speed exceeds the control start reference speed to a target limited opening degree for setting the traveling speed of the vehicle to the target limited speed.

The target limited speed is set to a target limited speed initial value at the start of the deceleration control, but may be changed during execution of the deceleration control. The change in the target limited speed will be described later, and the target limited speed initial value will be described here. The target limited speed initial value is set to a speed at which the wobble occurring in the straddle-type vehicle can be definitely removed, or the wobble occurring in the straddle-type vehicle can be definitely reduced to the extent that the straight traveling stability of the vehicle is not lowered. The speed at which the wobble occurring in the vehicle can be definitely removed, or the wobble occurring in the vehicle can be definitely reduced to the extent that the straight traveling stability of the vehicle is not lowered may vary for each vehicle type or individual vehicle. Therefore, it is preferable to set the target limited speed initial value to an appropriate value for each vehicle type or individual vehicle. Specifically, the target limited speed initial value set for the vehicle is preferably set to a value equal to or less than the control start reference speed set for the vehicle, and more preferably set to a value less than the control start reference speed set for the vehicle. In the present embodiment, the target limited speed initial value is set to 100 km/h. The target limited speed initial value is stored in the storage device 13. Details of the deceleration control, such as a method of determining the target limited opening degree, will be described later.

During the deceleration control, the throttle valve control device 9 also controls the throttle valve drive motor 8 to drive the throttle valve such that the throttle opening degree coincides with the target throttle opening degree output from the ECU 11 as during the normal speed control. During the deceleration control, since the deceleration device 22 gradually decreases the opening degree value set as the target throttle opening degree from the throttle opening degree when the vehicle speed exceeds the control start reference speed toward the target limited opening degree, even if the accelerator opening degree increases due to an accelerator operation by the driver of the vehicle, the throttle opening degree gradually decreases regardless of the increase in the accelerator opening degree. As a result, the traveling speed of the vehicle gradually decreases.

Figure 3:
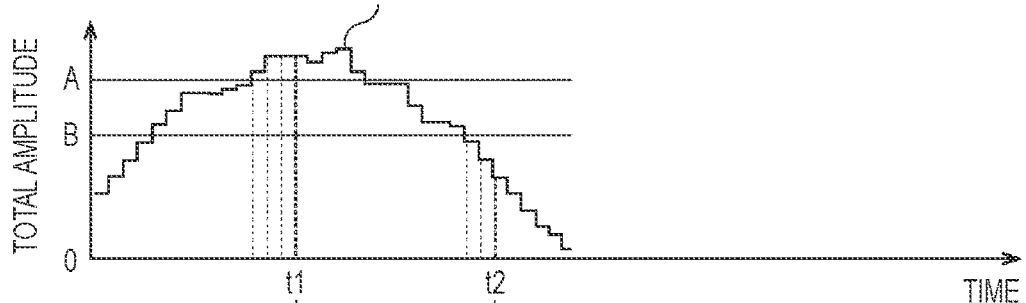
FIG. 3 is an explanatory diagram showing the total amplitude of the detection target vibration, a traveling speed, a target limited speed, an absolute value of a bank angle, a target unlimited opening degree corresponding to an accelerator opening degree, and a target throttle opening degree in a period during which a deceleration control is started, then the deceleration control is stopped, and then a speed recovery control is performed in the travel control device according to the first embodiment of the present disclosure.
Figure 3:
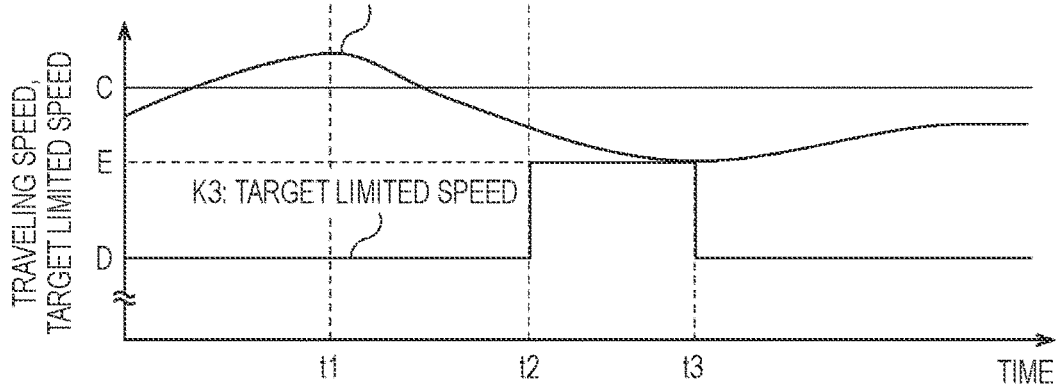
Figure 3:
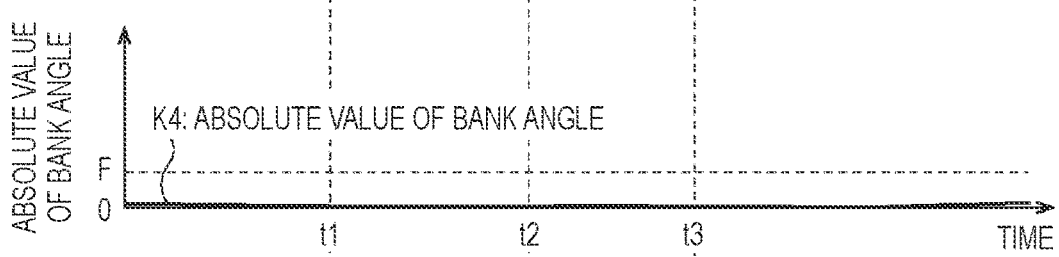
Figure 3:
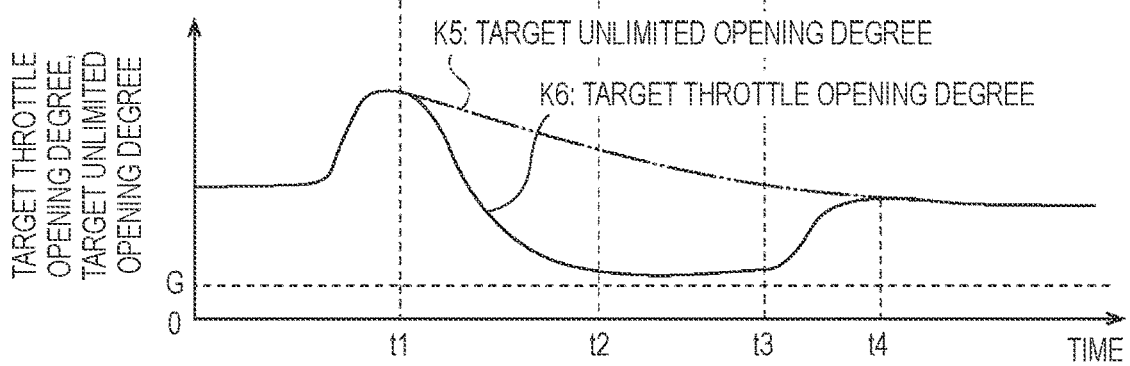

K1, K2, K3, K4, K5, and K6 in FIG. 3 respectively show the total amplitude of the detection target vibration, the traveling speed, the target limited speed, the absolute value of the bank angle, the target unlimited opening degree corresponding to the accelerator opening degree, and the target throttle opening degree in a period during which the deceleration control is started, then the deceleration control is stopped, and then the speed recovery control is performed. As shown in FIG. 3, at a time t1, the traveling speed K2 exceeds a control start reference speed C, the number of times that the total amplitude of the detection target vibration K1 continuously exceeds a control start reference total amplitude A reaches 4 times which is the control start reference number of times, and the absolute value of the bank angle K4 is equal to or less than a reference bank angle F. As a result, at the time t1, the deceleration control is started by the deceleration device 22 and the control of the traveling speed is shifted from the normal speed control to the deceleration control. After the time t1, the target throttle opening degree K6 gradually decreases toward a target limited opening degree G for setting the traveling speed as the target limited speed by the deceleration control. From the time t1 to a time t3, the target unlimited opening degree K5 corresponding to the accelerator opening degree is decreased by the accelerator operation by the driver of the vehicle, but a degree of decrease is much smaller than a degree of decrease in the target throttle opening degree K6. That is, from the time t1 to the time t3, the target throttle opening degree changes due to the deceleration control, and the target throttle opening degree during this period does not follow the accelerator opening degree. As a result of the deceleration control, the traveling speed K2 decreases from the time t1 to the time t3.

(Stop of Deceleration Control)

The deceleration stop device 23 of the travel control device 1 stops the deceleration control if the traveling speed of the vehicle detected by the vehicle speed sensor 4 becomes equal to or less than the target limited speed after the deceleration control is started by the deceleration device 22.

At a time when the deceleration control is started, the target limited speed initial value is set as the target limited speed. After the deceleration control is started, the deceleration stop device 23 determines whether the number of times that the total amplitude of the detection target vibration continuously becomes equal to or less than a control stop reference total amplitude exceeds a control stop reference number of times. Before the traveling speed of the vehicle becomes equal to or less than the target limited speed (target limited speed initial value), if the number of times that the total amplitude of the detection target vibration continuously becomes equal to or less than the control stop reference total amplitude exceeds the control stop reference number of times, a speed that is less than the traveling speed of the vehicle at that time by a predetermined allowance set amount is calculated as a target limited speed candidate value. The deceleration stop device 23 changes a setting of the target limited speed from the target limited speed initial value to the target limited speed candidate value if the target limited speed candidate value is greater than the target limited speed initial value, and maintains a state where the target limited speed initial value is set as the target limited speed if the target limited speed candidate value is equal to or less than the target limited speed initial value.

An object of changing the setting of the target limited speed from the target limited speed initial value to the target limited speed candidate value if the target limited speed candidate value is greater than the target limited speed initial value is to prevent inconvenience that before the traveling speed of the vehicle reaches the target limited speed initial value, when the wobble occurring in the vehicle disappears, or when the wobble occurring in the vehicle decreases to the extent that the straight traveling stability of the vehicle is not lowered, by stopping the deceleration control without waiting for the traveling speed of the vehicle to reach the target limited speed initial value, the deceleration control continues even though the wobble occurring in the vehicle is removed or sufficiently reduced. For this object, the control stop reference total amplitude is set to a value corresponding to the total amplitude of the detection target vibration at which the wobble is considered to disappear or to decrease to the extent that the wobble does not lower the straight traveling stability of the vehicle. The control stop reference total amplitude is set to a value less than the control start reference total amplitude. Specifically, the control stop reference total amplitude is preferably set to a value corresponding to the total amplitude of the detection target vibration when the yaw angular velocity of the vehicle is, for example, 0.18 rad/s to 0.25 rad/s. The control stop reference total amplitude may also be set to a different value for each vehicle type or individual vehicle. In the present embodiment, the control stop reference total amplitude is set to a value corresponding to the total amplitude of the detection target vibration when the yaw angular velocity of the vehicle is 0.22 rad/s, for example.

Instead of the traveling speed of the vehicle at the time when the total amplitude of the detection target vibration becomes equal to or less than the control stop reference total amplitude after the deceleration control is started, the traveling speed of the vehicle at the time when the number of times that the total amplitude of the detection target vibration continuously becomes equal to or less than the control stop reference total amplitude exceeds the control stop reference number of times after the deceleration control is started is used to calculate the target limited speed candidate value, and an object of this operation is to use, to calculate the target limited speed candidate value, the traveling speed of the vehicle when the wobble definitely disappears or definitely decreases to the extent that the wobble does not lower the straight traveling stability of the vehicle. For example, while the wobble occurs in the vehicle, other vibrations may occur, and the other vibrations may momentarily cancel out the wobble. If the traveling speed of the vehicle when the wobble is momentarily canceled in this way is used to calculate the target limited speed candidate value, there is a possibility that the deceleration control is stopped before the wobble is removed or reduced by the deceleration control. In order to prevent such an inconvenience, the traveling speed of the vehicle at the time when the number of times that the total amplitude of the detection target vibration continuously becomes equal to or less than the control stop reference total amplitude exceeds the control stop reference number of times is used to calculate the target limited speed candidate value. For this object, it is preferable to set the control stop reference number of times to the number of times capable of guaranteeing that the wobble definitely disappears, or that the wobble definitely decreases to the extent that the wobble does not lower the straight traveling stability of the vehicle, specifically about 2 to 5 times. In the present embodiment, the control stop reference number of times is set to 3 times, for example.

Instead of the traveling speed of the vehicle at the time when the number of times that the total amplitude of the detection target vibration continuously becomes equal to or less than the control stop reference total amplitude exceeds the control stop reference number of times after the deceleration control is started, the speed that is less than the traveling speed of the vehicle by the predetermined allowance set amount at the time when the number of times that the total amplitude of the detection target vibration continuously becomes equal to or less than the control stop reference total amplitude exceeds the control stop reference number of times after the deceleration control is started is calculated as the target limited speed candidate value, and an object of this operation is to stop the deceleration control after the wobble definitely disappears, or after the wobble definitely decreases to the extent that the straight traveling stability of the vehicle is not lowered. For example, while the traveling speed of the vehicle is higher than the target limited speed, it is possible that the wobble disappears once at a certain traveling speed, but then occurs again when the traveling speed decreases slightly. Therefore, if the traveling speed of the vehicle at the time when the number of times that the total amplitude of the detection target vibration continuously becomes equal to or less than the control stop reference total amplitude exceeds the control stop reference number of times is calculated as the target limited speed candidate value, and the target limited speed candidate value is set as the target limited speed, the wobble may occur again immediately after the deceleration control is stopped. In order to prevent such an inconvenience, the speed that is less than the traveling speed of the vehicle by a predetermined allowance set amount at the time when the number of times that the total amplitude of the detection target vibration continuously becomes equal to or less than the control stop reference total amplitude exceeds the control stop reference number of times is calculated as the target limited speed candidate value. For this object, it is preferable that the allowance set amount is an allowance value for setting the target limited speed candidate value to a speed at which the once-disappearing wobble will not occur again, specifically, 3 km/h to 10 km/h. In the present embodiment, the allowance set amount is set to 5 km/h.

A reason for maintaining the state where the target limited speed initial value is set as the target limited speed if the target limited speed candidate value is equal to or less than the target limited speed initial value is that if the target limited speed candidate value becomes equal to or less than the target limited speed initial value, compared to a case of changing the setting of the target limited speed from the target limited speed initial value to the target limited speed candidate value, the deceleration control can be stopped more early while the wobble occurring in the vehicle is definitely removed or reduced in the case of maintaining the state where the target limited speed initial value is set as the target limited speed.

In FIG. 3, at the time t2 before the traveling speed K2 of the vehicle reaches the target limited speed K3 set as a target limited speed initial value D, the number of times that the total amplitude of the detection target vibration K1 continuously exceeds a control stop reference total amplitude B reaches three times which is the control stop reference number of times. This means that before the traveling speed K2 of the vehicle reaches the target limited speed initial value D, the wobble occurring in the vehicle disappears or decreases to the extent that the straight traveling stability of the vehicle is not lowered. In response to this, the speed that is less than the traveling speed K2 of the vehicle at the time t2 by the predetermined allowance set amount is calculated as a target limited speed candidate value E, and the target limited speed candidate value E is greater than the target limited speed initial value D, and thus, the setting of the target limited speed K3 is changed from the target limited speed initial value D to the target limited speed candidate value E. After that, at the time t3, the traveling speed K2 reaches the target limited speed K3 changed to the target limited speed candidate value E, and thus, at the time t3, the deceleration control is stopped even though the traveling speed K2 of the vehicle is higher than the target limited speed initial value D. As described later, if the target limited speed is changed from the target limited speed initial value to the target limited speed candidate value during the execution of the deceleration control, the deceleration stop device 23 returns the target limited speed from the target limited speed candidate value to the target limited speed initial value immediately after stopping the deceleration control. This is a reason why the target limited speed K3 returns from the target limited speed candidate value E to the target limited speed initial value D immediately after the deceleration control is stopped at the time t3 in FIG. 3.

(Speed Recovery Control)

If the target unlimited opening degree corresponding to the accelerator opening degree detected by the accelerator position sensor 2 at the time when the deceleration control is stopped is greater than the throttle opening degree detected by the throttle position sensor 5 at the time when the deceleration control is stopped, the deceleration stop device 23 performs the speed recovery control to gradually increase the opening degree value set as the target throttle opening degree from the throttle opening degree at the time when the deceleration control is stopped to the target unlimited opening degree corresponding to the accelerator opening degree at the time when the deceleration control is stopped.

During the speed recovery control, the throttle valve control device 9 also controls the throttle valve drive motor 8 to drive the throttle valve such that the throttle opening degree coincides with the target throttle opening degree output from the ECU 11 as during the normal speed control. Accordingly, during the speed recovery control, even if the driver of the vehicle maintains a constant accelerator opening degree, the throttle opening degree gradually increases and the traveling speed of the vehicle gradually increases.

When the target unlimited opening degree corresponding to the accelerator opening degree at the time when the deceleration control is stopped is greater than the throttle opening degree at the time when the deceleration control is stopped, if the deceleration control is directly shifted to the normal speed control, the throttle opening degree suddenly changes from the throttle opening degree at the time when the deceleration control is stopped to the target unlimited opening degree corresponding to the accelerator opening degree at the time when the deceleration control is stopped, and as a result, the vehicle may suddenly accelerate. According to the speed recovery control, such sudden acceleration of the vehicle can be prevented. Details of the speed recovery control will be described later.

In FIG. 3, the target unlimited opening degree K5 corresponding to the accelerator opening degree at the time t3 is greater than the target throttle opening degree K6 at the time t3. Since the throttle opening degree follows the target throttle opening degree under the control of the throttle valve control device 9, the target throttle opening degree K6 at the time t3 can be identified with the throttle opening degree at the time t3. Then, the target unlimited opening degree K5 corresponding to the accelerator opening degree at the time t3 is greater than the throttle opening degree. Therefore, the speed recovery control is started at the time t3. Due to the speed recovery control, the target throttle opening degree K6 gradually increases from the time t3, and along therewith, the traveling speed K2 gradually increases from the time t3. After the target throttle opening degree K6 is gradually increased by the speed recovery control, at a time t4, the target throttle opening degree K6 matches the target unlimited opening degree K5 corresponding to the accelerator opening degree. At the time t4, the speed recovery control is stopped, and the traveling speed control is shifted from the speed recovery control to the normal speed control.

(Specific Flow of Process)

Figure 4:
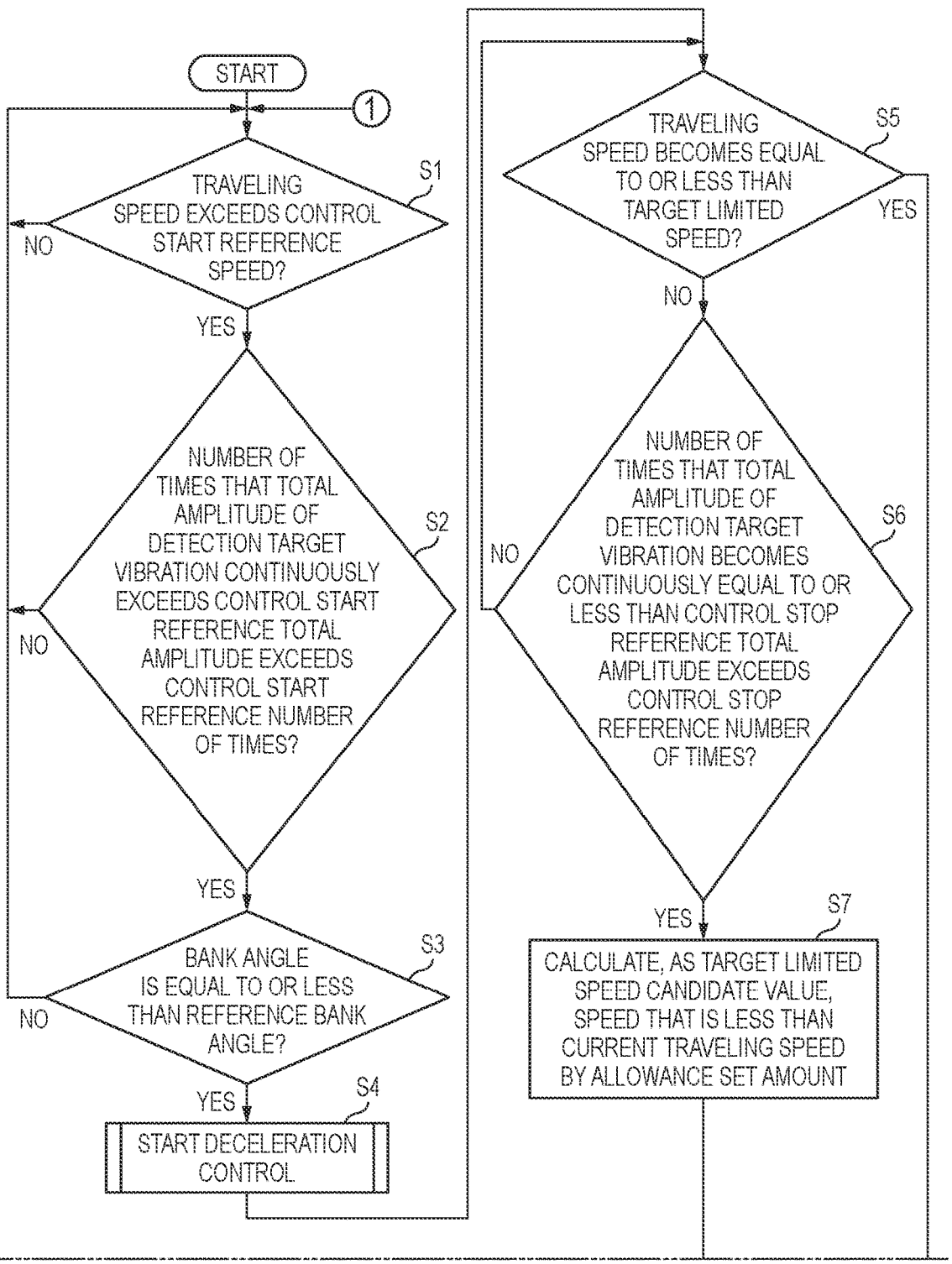
FIG. 4 is a flowchart showing a flow of a process in the travel control device according to the first embodiment of the present disclosure.

FIG. 4 shows a specific flow of a process in the travel control device 1. In FIG. 4, while the vehicle is traveling and the normal speed control is being performed by the speed controller 21, the deceleration device 22 determines whether the traveling speed of the vehicle detected by the vehicle speed sensor 4 exceeds the control start reference speed (step S1).

If the traveling speed of the vehicle detected by the vehicle speed sensor 4 exceeds the control start reference speed (step S1: YES), the deceleration device 22 determines whether the number of times that the total amplitude of the detection target vibration detected by the inertial measurement device 7 and the signal processing device 14 continuously exceeds the control start reference total amplitude reaches the control start reference number of times (step S2).

If the number of times that the total amplitude of the detection target vibration detected by the inertial measurement device 7 and the signal processing device 14 continuously exceeds the control start reference total amplitude reaches the control start reference number of times (step S2: YES), the deceleration device 22 determines whether the absolute value of the bank angle of the vehicle detected by the tilt angle sensor 6 or the inertial measurement device 7 is equal to or less than the reference bank angle (step S3).

If the absolute value of the bank angle of the vehicle detected by the tilt angle sensor 6 or the inertial measurement device 7 is equal to or less than the reference bank angle (step S3: YES), the speed controller 21 starts the deceleration control (step S4).

Figure 5:
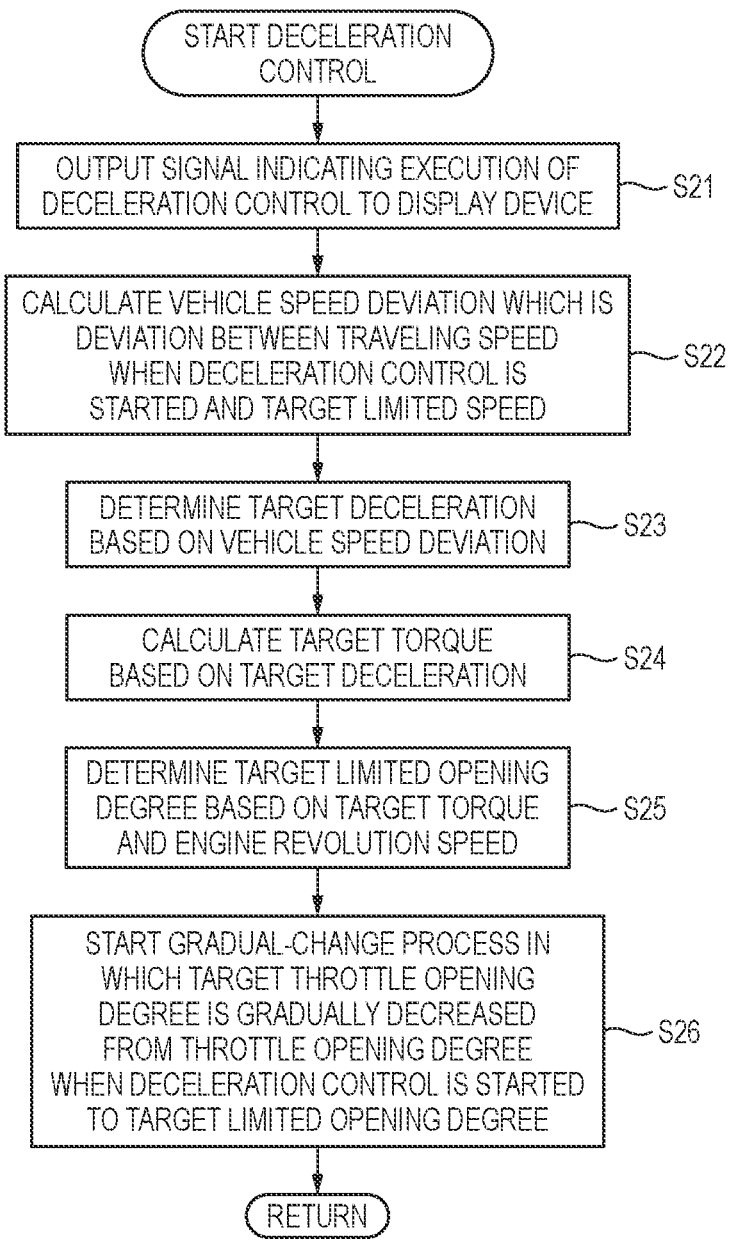
FIG. 5 is a flowchart showing the deceleration control in the travel control device according to the first embodiment of the present disclosure.

FIG. 5 shows a flow of a process at the start of the deceleration control performed in step S4. In FIG. 5, the deceleration device 22 outputs the signal indicating the execution of the deceleration control to the display device 10 to notify the driver of the vehicle that the deceleration control is being executed (step S21). For example, if the display device 10 is a lamp provided on a meter of the vehicle, the lamp lights or blinks based on the signal indicating the execution of the deceleration control. If the display device 10 is a display provided on the meter of the vehicle, a mark, an icon, an image, a character string, or the like indicating the execution of the deceleration control is displayed on the display based on the signal indicating the execution of the deceleration control.

Subsequently, the deceleration device 22 calculates a vehicle speed deviation, which is a deviation between the traveling speed of the vehicle detected by the vehicle speed sensor 4 when the deceleration control is started and the target limited speed (step S22). When the deceleration control is started, the target limited speed is set to the target limited speed initial value. Therefore, the vehicle speed deviation is the deviation between the traveling speed of the vehicle when the deceleration control is started and the target limited speed initial value.

Subsequently, the deceleration device 22 determines a target deceleration for reducing the traveling speed of the vehicle by the vehicle speed deviation based on the vehicle speed deviation (step S23). For example, the storage device 13 stores a lookup table describing a correspondence between the vehicle speed deviation and the target deceleration. The deceleration device 22 determines the target deceleration using the vehicle speed deviation calculated in step S22 and the above lookup table.

Subsequently, based on the target deceleration determined in step S23, the deceleration device 22 calculates a target torque which is a target value of a torque of a crankshaft for reducing, by engine braking, the traveling speed of the vehicle by the vehicle speed deviation (step S24). For example, the deceleration device 22 calculates a target load from the target deceleration determined in step S23, a vehicle weight, a traveling resistance estimated value, and the like, and calculates the target torque from the calculated target load, a tire diameter, a reduction ratio of a power transmission mechanism of the vehicle, and the like.

Subsequently, the deceleration device 22 determines the target limited opening degree based on the target torque calculated in step S24 and the engine revolution speed detected by the engine revolution sensor 3 when the deceleration control is started (step S25). For example, the storage device 13 stores an engine control map that describes a correspondence between the throttle opening degree, the engine revolution speed, and the torque of the crankshaft. The deceleration device 22 determines the target limited opening degree using the target torque calculated in step S24, the detected engine revolution speed, and the engine control map.

Subsequently, the deceleration device 22 starts a gradual-change process in which the target throttle opening degree is gradually decreased from the throttle opening degree detected by the throttle position sensor 5 when the deceleration control is started to the target limited opening degree (step S26).

On the other hand, in FIG. 4, if the traveling speed of the vehicle detected by the vehicle speed sensor 4 does not exceed the control start reference speed (step S1: NO), if the number of times that the total amplitude of the detection target vibration detected by the inertial measurement device 7 and the signal processing device 14 continuously exceeds the control start reference total amplitude does not reach the control start reference number of times (step S2: NO), or if the absolute value of the bank angle of the vehicle detected by the tilt angle sensor 6 or the inertial measurement device 7 is not equal to or less than the reference bank angle (step S3: NO), the deceleration control is not started, and the process returns to step S1.

After the deceleration control is started in step S4, the deceleration stop device 23 determines whether the traveling speed of the vehicle detected by the vehicle speed sensor 4 at current becomes equal to or less than the target limited speed (step S5).

If the traveling speed of the vehicle detected by the vehicle speed sensor 4 is not equal to or less than the target limited speed (step S5: NO), then the deceleration stop device 23 determines whether the number of times that the amplitude of the detection target vibration becomes continuously equal to or less than the control stop reference total amplitude exceeds the control stop reference number of times (step S6).

If the number of times that the amplitude of the detection target vibration continuously becomes equal to or less than the control stop reference total amplitude does not exceed the control stop reference number of times (step S6: NO), the process returns to step S5. Then, the deceleration stop device 23 repeats the determinations of steps S5 and S6 until the traveling speed of the vehicle becomes equal to or less than the target limited speed, or the amplitude of the detection target vibration continuously becomes equal to or less than the control stop reference total amplitude. During this time, the gradual-change process (see step S26 in FIG. 5) in the deceleration control proceeds. As a result, the target throttle opening degree gradually decreases toward the target limited opening degree, and accordingly, the throttle opening degree gradually decreases toward the target limited opening degree, and along therewith, the traveling speed of the vehicle gradually decreases toward the target limited speed.

Before the traveling speed of the vehicle becomes equal to or less than the target limited speed, if the number of times that the amplitude of the detection target vibration continuously becomes equal to or less than the control stop reference total amplitude exceeds the control stop reference number of times (step S6: YES), the deceleration stop device 23 calculates, as the target limited speed candidate value, the speed that is less than the traveling speed of the vehicle detected by the vehicle speed sensor 4 at current by the allowance set amount (step S7).

Subsequently, the deceleration stop device 23 determines whether the target limited speed candidate value calculated in step S7 is greater than the target limited speed initial value (step S8).

If the target limited speed candidate value calculated in step S7 is greater than the target limited speed initial value (step S8: YES), the deceleration stop device 23 changes the setting of the target limited speed from the target limited speed initial value to the target limited speed candidate value (step S9). On the other hand, if the target limited speed candidate value calculated in step S7 is equal to or less than the target limited speed initial value (step S8: NO), the deceleration stop device 23 does not perform the process of changing the setting of the target limited speed from the target limited speed initial value to the target limited speed candidate value. As a result, the state where the target limited speed initial value is set as the target limited speed is maintained.

Subsequently, the deceleration stop device 23 determines whether the traveling speed of the vehicle detected by the vehicle speed sensor 4 at current becomes equal to or less than the target limited speed (step S10).

If the traveling speed of the vehicle detected by the vehicle speed sensor 4 is not equal to or less than the target limited speed (step S10: NO), the deceleration stop device 23 repeats the determination of step S10 until the traveling speed of the vehicle becomes equal to or less than the target limited speed. During this time, the gradual-change process (see step S26 in FIG. 5) in the deceleration control proceeds. As a result, the target throttle opening degree gradually decreases toward the target limited opening degree, and accordingly, the throttle opening degree gradually decreases toward the target limited opening degree, and along therewith, the traveling speed of the vehicle gradually decreases.

If the traveling speed of the vehicle detected by the vehicle speed sensor 4 becomes equal to or less than the target limited speed (step S10: YES), the deceleration stop device 23 stops the deceleration control (S11). Specifically, the deceleration stop device 23 stops the gradual-change process in step S26 in FIG. 5.

If the traveling speed of the vehicle detected by the vehicle speed sensor 4 in step S5 becomes equal to or less than the target limited speed, the deceleration stop device 23 also stops the deceleration control. The case where the traveling speed of the vehicle detected by the vehicle speed sensor 4 becomes equal to or less than the target limited speed in step S5 is a case where the traveling speed of the vehicle becomes equal to or less than the target limited speed initial value before the number of times that the amplitude of the detection target vibration continuously becomes equal to or less than the control stop reference total amplitude exceeds the control stop reference number of times. As described above, the target limited speed initial value is set to a speed at which the wobble occurring in the straddle-type vehicle can be definitely removed, or the wobble occurring in the straddle-type vehicle can be definitely reduced to the extent that the straight traveling stability of the vehicle is not lowered, and the control stop reference total amplitude is set to a value corresponding to the total amplitude of the detection target vibration at which the wobble is considered to disappear or to decrease to the extent that the wobble does not lower the straight traveling stability of the vehicle. Therefore, it is difficult for the traveling speed of the vehicle to become equal to or less than the target limited speed initial value before the number of times that the amplitude of the detection target vibration continuously becomes equal to or less than the control stop reference total amplitude exceeds the control stop reference number of times. However, in the following cases, such a matter may occur. In a first case, the vehicle decelerates within a short period of time, such as by applying the wheel brakes by the driver of the vehicle. That is, since the frequency of the wobble is low, a wobble period is long (for example, if the frequency of the wobble is 1 Hz, the wobble period is 1 second). Therefore, for example, when the driver of the vehicle applies the wheel brake immediately after the start of the deceleration control, before the number of times that the amplitude of the detection target vibration continuously becomes equal to or less than the control stop reference total amplitude exceeds the control stop reference number of times, the traveling speed of the vehicle may become equal to or less than the target limited speed initial value. Of course, in this case, the wobble disappears or decreases to the extent that straight traveling performance of the vehicle is not lowered when the traveling speed of the vehicle becomes equal to or less than the target limited speed initial value. In a second case, the vehicle shakes due to, for example, undulations on a road, and a frequency of the shaking accidentally coincides with the frequency of the wobble. In this case, even if the vehicle decelerates, the shaking of the vehicle due to undulations on the road will not subside, and as a result, before the number of times that the amplitude of the detection target vibration continuously becomes equal to or less than the control stop reference total amplitude exceeds the control stop reference number of times, the traveling speed of the vehicle may become equal to or less than the target limited speed initial value.

If the deceleration stop device 23 executes the process of changing the setting of the target limited speed from the target limited speed initial value to the target limited speed candidate value (step S9), immediately after the deceleration control is stopped, the setting of the target limited speed is returned from the target limited speed candidate value to the target limited speed initial value (step S12).

Figure 6:
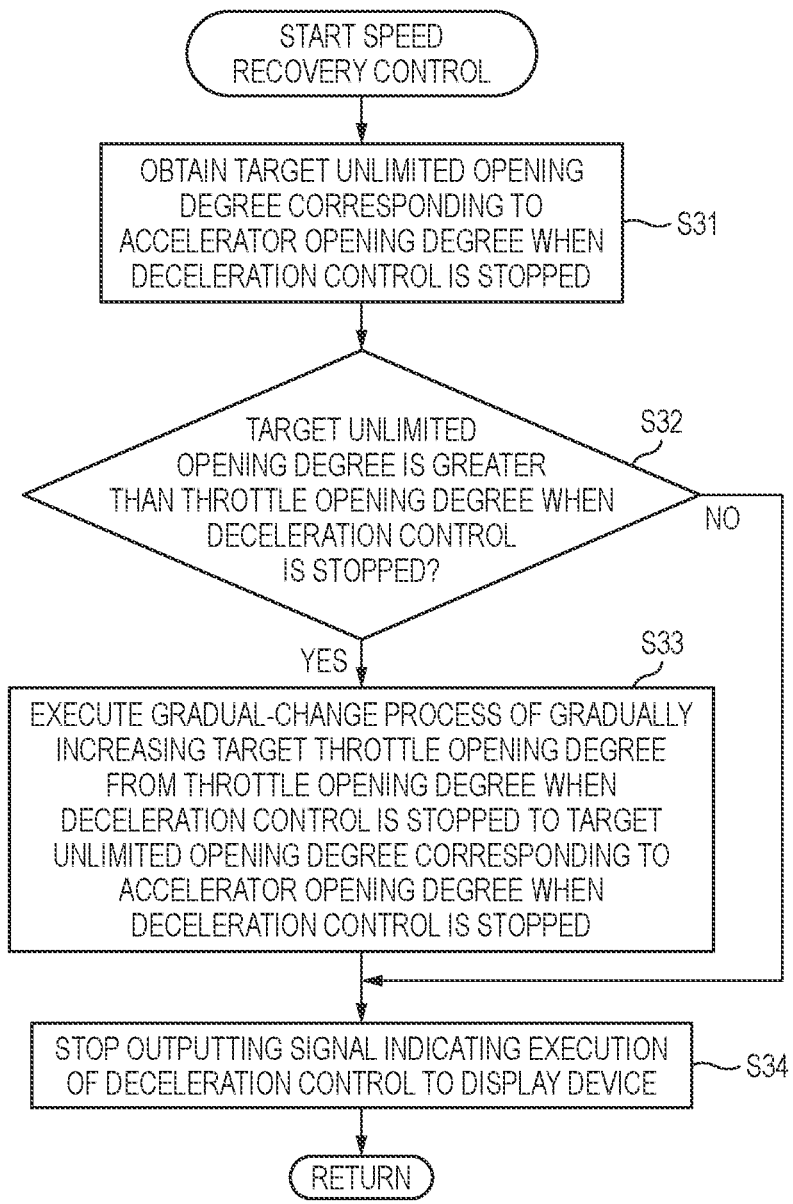
FIG. 6 is a flowchart showing the speed recovery control in the travel control device according to the first embodiment of the present disclosure.

Subsequently, the deceleration stop device 23 performs the speed recovery control (step S13). FIG. 6 shows a flow of the speed recovery control performed in step S13. In FIG. 6, the deceleration stop device 23 obtains the target unlimited opening degree corresponding to the accelerator opening degree detected by the accelerator position sensor 2 when the deceleration control is stopped (step S31). Subsequently, the deceleration stop device 23 determines whether the target unlimited opening degree obtained in step S31 is greater than the throttle opening degree detected by the throttle position sensor 5 when the deceleration control is stopped (step S32). If the target unlimited opening degree obtained in step S31 is greater than the throttle opening degree detected by the throttle position sensor 5 when the deceleration control is stopped (step S32: YES), the deceleration stop device 23 executes a gradual-change process of gradually increasing the target throttle opening degree from the throttle opening degree when the deceleration control is stopped to the target unlimited opening degree corresponding to the accelerator opening degree when the deceleration control is stopped (step S33). As a result of the gradual-change process, the throttle opening degree gradually increases toward the target unlimited opening degree corresponding to the accelerator opening degree when the deceleration control is stopped, and the traveling speed of the vehicle gradually increases accordingly.

On the other hand, if the target unlimited opening degree obtained in step S31 is equal to or less than the throttle opening degree detected by the throttle position sensor 5 when the deceleration control is stopped (step S32: NO), since the vehicle does not suddenly accelerate even if the gradual-change process in step S33 is not performed, the deceleration stop device 23 does not perform the gradual-change process in step S33.

After the gradual-change process in step S33 ends, or after it is determined in step S32 that the gradual-change process in step S33 is not performed, the deceleration stop device 23 stops outputting the signal indicating the execution of the deceleration control to the display device 10 (step S34). Accordingly, the lamp indicating the execution of the deceleration control is turned off, or the mark or the like indicating the execution of the deceleration control disappears from the display.

After the speed recovery control ends, the process returns to step S1 in FIG. 4. After the speed recovery control ends, the control on the traveling speed of the vehicle shifts to the normal speed control.

As described above, if the traveling speed of the vehicle exceeds the control start reference speed, the number of times that the total amplitude of the detection target vibration continuously exceeds the control start reference total amplitude reaches the control start reference number of times, and the bank angle of the vehicle is equal to or less than the reference bank angle, the travel control device 1 according to the first embodiment of the present disclosure performs the deceleration control to decelerate the traveling speed of the vehicle. Accordingly, the wobble can be prevented, and lowering in the straight traveling stability of the vehicle can be prevented when the vehicle is traveling at medium to high speed of approximately 100 km/h or more, for example. The travel control device 1 according to the present embodiment can prevent the wobble by decelerating the traveling speed of the vehicle, and thus, it is not necessary to add a mechanical device or structure to the vehicle, such as mounting a caster angle variable device on the vehicle, in order to prevent the wobble. Therefore, an increase in a size or weight of the straddle-type vehicle is avoided and the wobble can be prevented.

According to the travel control device 1, three conditions are that the traveling speed of the vehicle exceeds the control start reference speed, the number of times that the total amplitude of the detection target vibration continuously exceeds the control start reference total amplitude reaches the control start reference number of times, and the bank angle of the vehicle is equal to or less than the reference bank angle, and if the three conditions are satisfied, it is recognized that the wobble occurs in the vehicle, and the deceleration control is performed. Accordingly, it is possible to recognize with high accuracy that the wobble occurs in the vehicle, and it is possible to appropriately perform the deceleration control. Specifically, it is possible to prevent that the occurrence of the wobble in the vehicle cannot be recognized and the deceleration control failures to be performed, and prevent that other vibrations occurring in the vehicle are mistakenly recognized as the wobble, and the deceleration control is performed even though the wobble does not occur in the vehicle.

The travel control device 1 according to the present embodiment stops the deceleration control if the traveling speed of the vehicle becomes equal to or less than the target limited speed after the deceleration control is started. At the start of deceleration control, the target limited speed initial value, which is a predetermined speed equal to or less than the control start reference speed, is set as the target limited speed, and after the deceleration control is started, the travel control device 1 calculates, as the target limited speed candidate value, the speed that is less than the traveling speed of the vehicle by the predetermined amount at the time when the number of times that the total amplitude of the detection target vibration continuously becomes equal to or less than the control stop reference total amplitude reaches the control stop reference number of times, changes the setting of the target limited speed from the target limited speed initial value to the target limited speed candidate value if the target limited speed candidate value is greater than the target limited speed initial value, and maintains the state where the target limited speed initial value is set as the target limited speed if the target limited speed candidate value is equal to or less than the target limited speed initial value. Accordingly, the deceleration control can be quickly stopped when the wobble occurring in the vehicle disappears or decreases to the extent that the straight traveling stability of the vehicle is not lowered. Accordingly, by continuing the deceleration control even though the wobble disappears, or the wobble decreases to the extent that the straight traveling stability of the vehicle is not lowered, it is possible to prevent the vehicle from unnecessarily decelerating, and to prevent the driver of the vehicle from wasting an opportunity to accelerate the vehicle by operating the accelerator.

After the deceleration control is started, the travel control device 1 according to the present disclosure uses the traveling speed of the vehicle at the time when the number of times that the total amplitude of the detection target vibration continuously becomes equal to or less than the control stop reference total amplitude exceeds the control stop reference number of times to calculate the target limited speed candidate value. Accordingly, the traveling speed of the vehicle when the wobble definitely disappears or definitely decreases to the extent that the wobble does not lower the straight traveling stability of the vehicle can be used to calculate the target limited speed candidate value. If the traveling speed of the vehicle when the wobble does not disappear or does not decrease to the extent that the wobble does not lower the straight traveling stability of the vehicle is used to calculate the target limited speed candidate value, the deceleration control stops before the wobble is removed or sufficiently reduced by the deceleration control. According to the present embodiment, the above matter can be prevented.

After the deceleration control is started, the travel control device 1 according to the present disclosure calculates, as the target limited speed candidate value, the speed that is less than the traveling speed of the vehicle by the allowance set amount at the time when the number of times that the total amplitude of the detection target vibration continuously becomes equal to or less than the control stop reference total amplitude exceeds the control stop reference number of times. Accordingly, it is possible to prevent the deceleration control from stopping before the wobble disappears or before the wobble decreases to the extent that the straight traveling stability of the vehicle is not lowered.

If the target unlimited opening degree corresponding to the accelerator opening degree at the time when the deceleration control is stopped is greater than the throttle opening degree at the time when the deceleration control is stopped, the travel control device 1 according to the present disclosure performs the speed recovery control to gradually increase the opening degree value set as the target throttle opening degree from the throttle opening degree at the time when the deceleration control is stopped to the target unlimited opening degree corresponding to the accelerator opening degree at the time when the deceleration control is stopped. Accordingly, even if the throttle opening degree becomes significantly less than the target unlimited opening degree corresponding to the accelerator opening degree due to the deceleration control, it is possible to prevent the sudden acceleration of the vehicle when the deceleration control is stopped.

Second Embodiment

Figure 7:
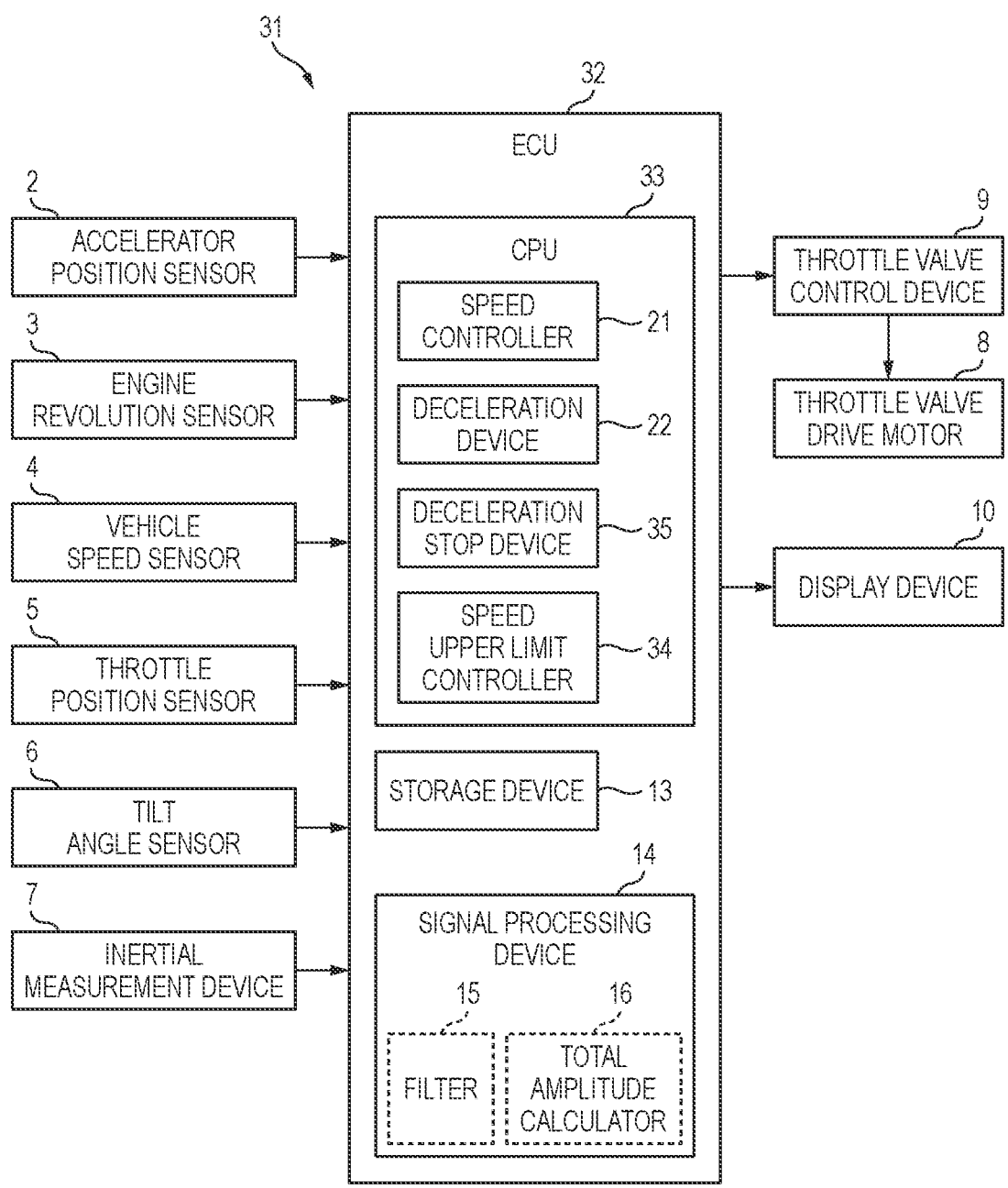
FIG. 7 is a block diagram showing a travel control device according to a second embodiment of the present disclosure.
Figure 8:
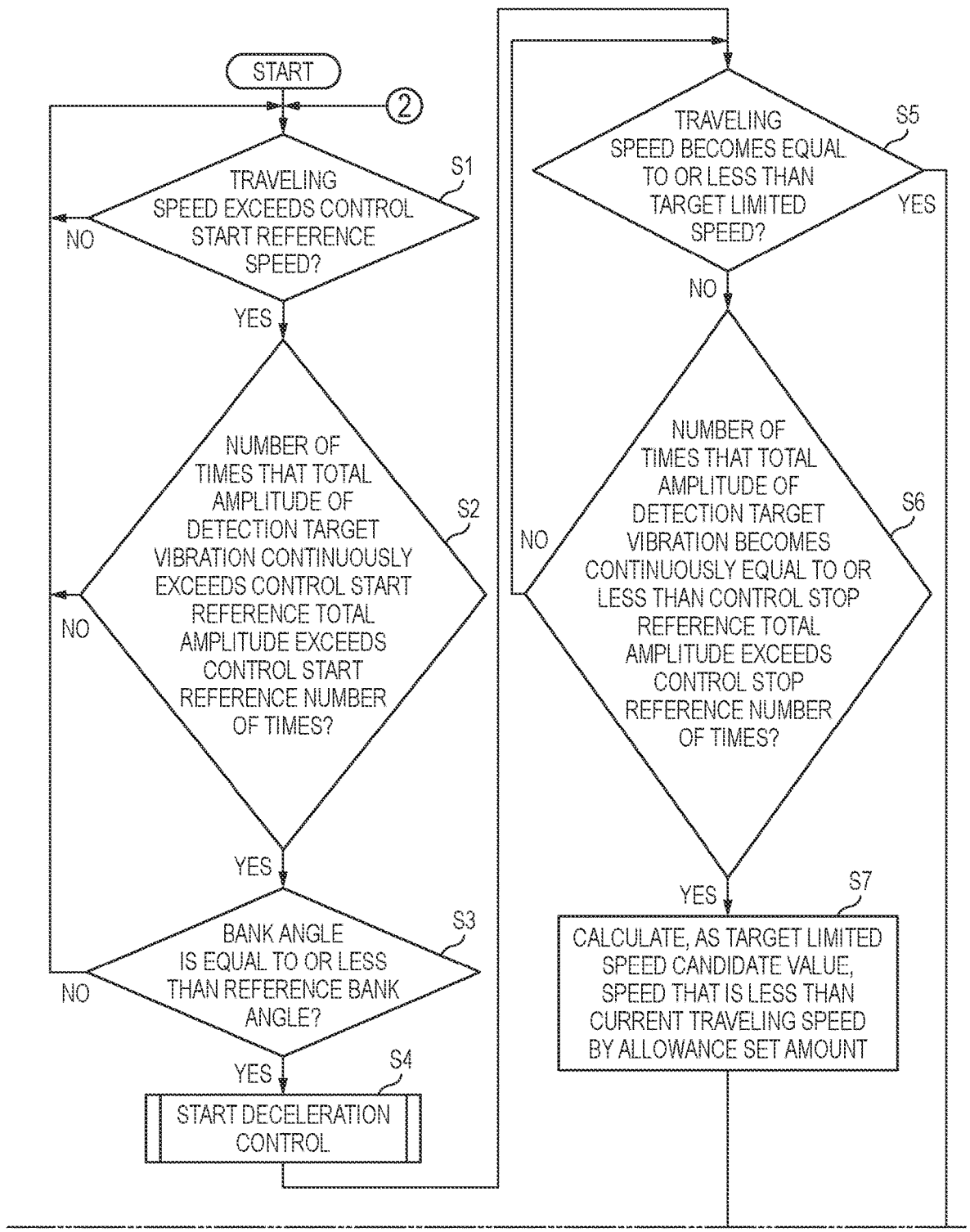
FIG. 8 is a flowchart showing a flow of a process in the travel control device according to the second embodiment of the present disclosure.

FIG. 7 shows a travel control device 31 according to a second embodiment of the present disclosure. FIG. 8 shows a flow of a process in the travel control device 31. Among constituent elements of the travel control device 31 according to the second embodiment shown in FIG. 7, the constituent elements that are the same as the constituent elements of the travel control device 1 according to the first embodiment are denoted by the same reference numerals as those of the constituent elements of the travel control device 1 according to the first embodiment shown in FIG. 1, and descriptions thereof are omitted. Among processing steps of the travel control device 31 according to the second embodiment shown in FIG. 8, the steps that are the same as the processing steps of the travel control device 1 according to the first embodiment are denoted by the same reference numerals as those of the processing steps of the travel control device 1 according to the first embodiment shown in FIG. 4, and descriptions thereof are omitted.

In FIG. 7, the travel control device 31 according to the second embodiment of the present disclosure includes a speed upper limit controller 34. That is, a CPU 33 included in an ECU 32 of the travel control device 31 functions as the speed upper limit controller 34 by reading and executing a program stored in the storage device 13, for example. The speed upper limit controller 34 limits the traveling speed of the vehicle to an upper limit speed or less. That is, the speed upper limit controller 34 is a speed limiter in the vehicle. A predetermined upper limit speed initial value is set as the upper limit speed before the deceleration control is performed for a first time in the vehicle.

When the deceleration control is performed and then the deceleration control is stopped, a deceleration stop device 35 in the travel control device 31 changes a setting of the upper limit speed from the upper limit speed initial value to the target limited speed (step S41 in FIG. 8). Accordingly, after the deceleration control is performed, the upper limit speed becomes the target limited speed. Specifically, in the process of the travel control device 31, if step S9 is not executed and the state where the target limited speed initial value is set as the target limited speed is maintained, the upper limit speed becomes the target limited speed initial value. In the process of the travel control device 31, if step S9 is executed and the setting of the target limited speed is changed from the target limited speed initial value to the target limited speed candidate value is maintained, the upper limit speed becomes the target limited speed candidate value. The deceleration stop device 35 does not perform the speed recovery control.

When the upper limit speed becomes the target limited speed initial value or the target limited speed candidate value, the speed upper limit controller 34 limits the traveling speed of the vehicle to the target limited speed initial value or less or to the target limited speed candidate value or less. Accordingly, the wobble will not occur in the vehicle in the future. However, since the traveling speed of the vehicle is limited to the target limited speed initial value or the target limited speed candidate value or less, it is conceivable that the driver of the vehicle may feel inconvenient in driving the vehicle. When the upper limit speed becomes the target limited speed initial value or the target limited speed candidate value, the vehicle is inspected in a short period of time to find out the cause of the wobble, and it is desirable to repair the vehicle to eliminate the cause. For example, when an inspector or repairer of the vehicle resets or initializes the ECU 11, the upper limit speed returns to the upper limit speed initial value.

The deceleration stop device 35 does not stop outputting the signal indicating the execution of the deceleration control to the display device 10 after the deceleration control is stopped. Accordingly, the state where the lamp indicating the execution of the deceleration control is lit or blinking, or a state where a mark indicating the execution of the deceleration control is displayed in the display continues, and thus, the driver of the vehicle can know that the traveling speed of the vehicle is limited to the target limited speed initial value or less or the target limited speed candidate value or less (upper limit speed of the vehicle less than normal).

In the above embodiments, after the deceleration control is started, the deceleration stop device 23 calculates, as the target limited speed candidate value, the speed that is less than the traveling speed of the vehicle by the predetermined amount at the time when the number of times that the total amplitude of the detection target vibration continuously becomes equal to or less than the control stop reference total amplitude reaches the control stop reference number of times, but the present disclosure does not limited thereto. After the deceleration control is started, the speed that is less than the traveling speed of the vehicle by the predetermined amount at the time when the total amplitude of the detection target vibration becomes equal to or less than the control stop reference total amplitude may be calculated as the target limited speed candidate value.

In each of the above embodiments, if the setting of the target limited speed is changed from the target limited speed initial value to the target limited speed candidate value, the deceleration stop device 23 returns the setting of the target limited speed to the target limited speed initial value after the deceleration control is stopped, but if the setting of the target limited speed is changed from the target limited speed initial value to the target limited speed candidate value, the deceleration stop device 23 may not return the setting of the target limited speed to the target limited speed initial value after the deceleration control is stopped. The setting of the target limited speed may always be the target limited speed initial value.

In each of the above embodiments, the deceleration device 22 performs the deceleration control if the traveling speed of the vehicle exceeds the control start reference speed and the number of times that the total amplitude of the detection target vibration exceeds the control start reference total amplitude continuously reaches the control start reference number of times, and may not perform the deceleration control if the traveling speed of the vehicle exceeds the control start reference speed and the total amplitude of the detection target vibration exceeds the control start reference total amplitude.

In each of the above embodiments, it is determined whether to perform the deceleration control based on the total amplitude of the detection target vibration, and it is also possible to determine whether to perform the deceleration control based on the amplitude on the plus side or the minus side of the detection target vibration.

The condition that the bank angle of the vehicle is equal to or less than the reference bank angle may be removed from the conditions for the deceleration device 22 to perform the deceleration control. A condition that the vehicle is accelerating may be added to the conditions for the deceleration device 22 to perform the deceleration control.

In each of the above embodiments, the wobble is detected based on the vibration of the vehicle in the yaw direction, but the present disclosure is not limited thereto, and the wobble may be detected based on a vibration of the vehicle in the roll direction, or vibrations in the yaw direction and roll direction.

During the deceleration control or speed recovery control, if the driver of the vehicle decelerates the vehicle significantly, the deceleration control or speed recovery control may be stopped immediately. It is possible to recognize that the driver of the vehicle operates the accelerator to significantly decelerate the vehicle, for example, by detecting the accelerator opening degree with the accelerator position sensor 2.

The present disclosure can also be applied to a straddle-type vehicle other than motorcycles. The present disclosure can also be applied to a straddle-type vehicle having a power source other than an engine (internal combustion engine) as a power source for traveling.

The present disclosure can be appropriately changed without departing from the gist or concept of the disclosure which can be read from the claims and the entire description, and a travel control device accompanied with such a change is also included in the technical concept of the present disclosure.

What is claimed is:

1. A travel control device for controlling traveling of a straddle-type vehicle, comprising:
    a controller;
    a vehicle speed sensor configured to detect a traveling speed of the straddle-type vehicle; and
    an acceleration sensor and a gyro or angular velocity sensor configured to detect a detection target vibration which is a vibration in a yaw direction or roll direction of the straddle-type vehicle and has a frequency within a reference frequency range, wherein
    the controller is configured to:
        perform a deceleration control to decelerate the traveling speed of the straddle-type vehicle if the traveling speed of the straddle-type vehicle detected by the vehicle speed detector exceeds a control start reference speed and if an amplitude of the detection target vibration detected by the vibration detector exceeds a control start reference amplitude a number of times in a plural number of timings, and the number of times that the amplitude of the detection target vibration detected by the vibration detector consecutively exceeds the control start reference amplitude reaches a control start reference number of times; and
        stop the deceleration control if the traveling speed of the straddle-type vehicle detected by the vehicle speed detector becomes equal to or less than a target limited speed after the deceleration control is started.

2. The travel control device according to claim 1, wherein the target limited speed is a predetermined speed equal to or less than the control start reference speed.

3. The travel control device according to claim 1, wherein after the deceleration control is started, the controller sets, as the target limited speed, a speed that is less than the traveling speed of the straddle-type vehicle detected by the vehicle speed detector by a predetermined amount at a time when the amplitude of the detection target vibration detected by the vibration detector becomes equal to or less than a control stop reference amplitude.

4. The travel control device according to claim 3, wherein the control stop reference amplitude is a predetermined amplitude less than the control start reference amplitude.

5. The travel control device according to claim 1, wherein after the deceleration control is started, the controller sets, as the target limited speed, a speed that is less than the traveling speed of the straddle-type vehicle detected by the vehicle speed detector by a predetermined amount at a time when the number of times that the amplitude of the detection target vibration detected by the vibration detector consecutively becomes equal to or less than a control stop reference amplitude reaches a control stop reference number of times.

6. The travel control device according to claim 1, wherein a target limited speed initial value, which is a predetermined speed equal to or less than the control start reference speed, is set as the target limited speed, and after the deceleration control is started, the controller calculates, as a target limited speed candidate value, a speed that is less than the traveling speed of the straddle-type vehicle detected by the vehicle speed detector by a predetermined amount at a time when the amplitude of the detection target vibration detected by the vibration detector becomes equal to or less than a control stop reference amplitude, changes a setting of the target limited speed from the target limited speed initial value to the target limited speed candidate value if the target limited speed candidate value is greater than the target limited speed initial value, and maintains a state where the target limited speed initial value is set as the target limited speed if the target limited speed candidate value is equal to or less than the target limited speed initial value.

7. The travel control device according to claim 1, wherein a target limited speed initial value, which is a predetermined speed equal to or less than the control start reference speed, is set as the target limited speed, and after the deceleration control is started, the controller calculates, as a target limited speed candidate value, a speed that is less than the traveling speed of the straddle-type vehicle detected by the vehicle speed detector by a predetermined amount at a time when the number of times that the amplitude of the detection target vibration detected by the vibration detector becomes equal to or less than a control stop reference amplitude reaches a control stop reference number of times, changes a setting of the target limited speed from the target limited speed initial value to the target limited speed candidate value if the target limited speed candidate value is greater than the target limited speed initial value, and maintains a state where the target limited speed initial value is set as the target limited speed if the target limited speed candidate value is equal to or less than the target limited speed initial value.

8. The travel control device according to claim 1, further comprising: an accelerator position sensor configured to detect an accelerator opening degree; and a throttle valve drive motor configured to drive a throttle valve such that a throttle opening degree matches a target throttle opening degree, wherein the controller is configured to control the traveling speed of the straddle-type vehicle by setting, as the target throttle opening degree, a first target opening degree corresponding to the accelerator opening degree detected by the accelerator opening degree detector while the deceleration control or a speed recovery control is not being performed, the controller performs the deceleration control by gradually decreasing an opening degree value set as the target throttle opening degree from the throttle opening degree when the traveling speed of the straddle-type vehicle exceeds the control start reference speed to a target limited opening degree for setting the traveling speed of the straddle-type vehicle to the target limited speed, and if the first target opening degree corresponding to the accelerator opening degree detected by the accelerator opening degree detector at a time when the deceleration control is stopped is greater than the throttle opening degree at the time when the deceleration control is stopped, the controller performs the speed recovery control to gradually increase the opening degree value set as the target throttle opening degree from the throttle opening degree at the time when the deceleration control is stopped to the the first target opening degree corresponding to the accelerator opening degree detected by the accelerator opening degree detector at the time when the deceleration control is stopped.

9. The travel control device according to claim 1, wherein
the controller is configured to limit the traveling speed of the straddle-type vehicle to an upper limit speed or less,
before the deceleration control is performed for a first time in the straddle-type vehicle, a predetermined upper limit speed initial value is set as the upper limit speed, and
the controller changes a setting of the upper limit speed from the upper limit speed initial value to the target limited speed when the deceleration control is performed.

* * * * *